UNITED STATES PATENT OFFICE

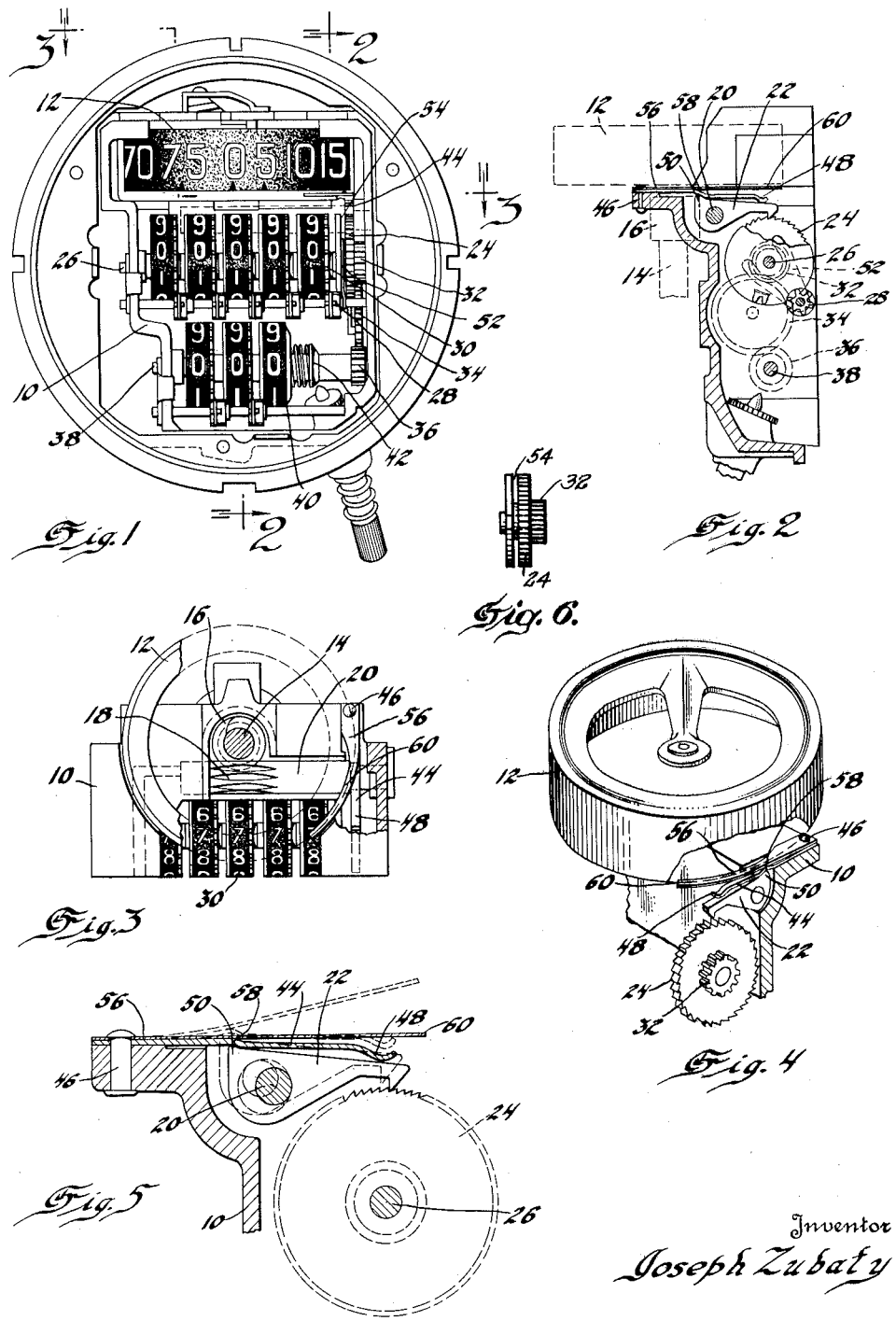

JOSEPH ZUBATY, OF FLINT, MICHIGAN, ASSIGNOR TO A C SPARK PLUG COMPANY, OF FLINT, MICHIGAN, A COMPANY OF MICHIGAN

RATCHET DRIVE FOR SPEEDOMETERS

Application filed March 9, 1928. Serial No. 260,420.

My invention relates to speedometer mechanism of the type commonly used on motor vehicles to indicate the speed of the vehicle and the mileage traveled. It relates particularly to such instruments in which the odometer mechanism is driven by means of a pawl and ratchet wheel instead of the usual worm gear drive. The advantages of the ratchet drive are that it is much simpler and cheaper, since it eliminates several worm gears which are expensive to produce.

When using a pawl and ratchet wheel drive, some means must be provided to resiliently hold the pawl against the ratchet wheel. This usually consists of a spring which presses against the pawl. The objection to this is that since the pawl is being constantly pressed against the ratchet wheel, a clicking noise will be caused each time the pawl slides over a ratchet tooth. Not only is this noise objectionable, but unnecessary wear on both the pawl and the ratchet wheel takes place.

An object of my invention is to so construct the pawl and ratchet drive mechanism that the pawl will only be pressed against the ratchet wheel on its driving stroke and will be held away from the ratchet wheel on its return stroke.

The speedometer indicating mechanism is of the type in which a speed cup, bearing figures indicating miles, is rotated in proportion to the speed at which the vehicle is traveling. Since this speed cup is necessarily very freely journaled and delicately balanced in order to be accurate and sensitive to speed changes, it is apt to swing back and forth when the vehicle is being driven over a rough road, thus rendering it difficult to observe the indications of the speed cup to determine at what speed the vehicle is traveling. In my improved construction, this objection is overcome by means of a small spring member which is intermittently pressed against the speed cup to steady it and to hold it in the position which will indicate the correct speed of the vehicle. This spring member is so arranged that it is actuated by the movement of the pawl as it drives the odometer mechanism.

Other objects and advantages will be apparent upon referring to the specification and accompanying drawing in which:

Figure 1 is a front view of a speedometer with the face plate removed to show my improved pawl and ratchet driving mechanism, and the speed cup steadying means, in connection therewith.

Figure 2 is a section taken on the line 2—2 of Figure 1.

Figure 3 is a section taken on the line 3—3 of Figure 1, with parts broken away to more clearly show my invention.

Figure 4 is a fragmentary perspective view of the speed cup and the ratchet wheel, showing my invention associated therewith.

Figure 5 is a fragmentary section showing the extreme positions of the pawl, the spring for holding it against the ratchet wheel, and the spring member which is pressed against the speed cup to steady it.

Figure 6 is a detail view of the ratchet wheel.

The reference numeral 10 indicates a speedometer frame in which is rotatably mounted a speed cup 12, bearing figures which indicate the number of miles at which the vehicle is traveling. This speed cup is magnetically driven in a well-known manner by a rotor mounted inside of it on a rotor shaft 14. On the shaft 14 are cut worm teeth 16, which mesh with worm teeth 18 cut on a worm shaft 20 which is journaled in the frame. Eccentrically journaled on the worm shaft 20 is a pawl 22, which is adapted to engage a ratchet wheel 24, rotatably mounted on a shaft 26 which is supported in the frame. This ratchet wheel is connected by means of a star wheel 28 with the season mileage figure wheels 30, which are connected with each other in the usual manner. A gear 32 is secured to the ratchet wheel and through an intermediate gear 34 drives a gear 36 mounted on a shaft 38. The gear 36 is connected with the trip mileage figure wheels 40 by reset mechanism 42 in the usual manner.

In order to hold the pawl against the ratchet wheel 24, a spring 44 is secured to the frame by means of rivet 46, with its end 48 normally tending to press the pawl against the ratchet wheel, when the latter is being driven. Since it is not necessary that the pawl be held against the ratchet wheel on its return stroke, I have provided a cam portion 50 on the pawl which will engage the spring 44 when the pawl is at the end of its driving stroke, and this engagement will cause the spring 44 to be sprung upwardly and will also cause the pawl 22 to pivot on the shaft 20 so that the end of the pawl will not bear against the ratchet wheel. This condition will continue until the pawl has completed its return stroke, when due to the fact that the eccentric motion will pull the cam portion 50 away from the spring 44, the end of the pawl will again be pressed into engagement with the ratchet wheel by the end 48 of the spring to be ready for the next driving stroke. It will be readily seen that there will be no possibility of causing clicking noises due to the pawl sliding over the ratchet teeth, neither will there be any wear on either the pawl or ratchet wheel since no sliding action whatever takes place, the two parts moving together whenever they are in engagement.

The ratchet wheel 24 is held stationary, while the pawl is being advanced to the next ratchet tooth, by means of a stamping 52 which is supported on the shaft which carries the star wheels 28. A groove 54 is formed in the ratchet wheel 24, and an offset portion on the stamping, of greater width than the groove, bears against both sides of the groove, thereby exerting enough pressure to prevent rotation of the ratchet wheel except when it is moved by the driving action of the pawl 22. It will be readily understood for each revolution of the ratchet wheel 24 the adjacent figure wheel 30 will be moved one-tenth of a revolution, and the right hand trip mileage figure wheel 40 will be rotated a complete revolution.

Since the speed cup 12 must be very freely pivoted and delicately balanced in the frame 10, it will tend to swing back and forth upon the slightest movement of the speedometer as when the vehicle is rocking back and forth when going over rough road. This, of course, causes the figures on the speed cup to be constantly changing so that it is difficult to determine at what speed the vehicle is traveling. In order to avoid this, I have provided a spring member 56 which is located immediately above the spring 44 and is also held in place by the rivet 46. The opposite end of this member normally lies just below the bottom of the speed cup, not touching the latter. However, when the spring 44 is moved upward by the pawl 22 at the end of its driving stroke, a raised portion 58 on the spring 44 engages the spring 56 and causes the free end 60 of the latter to be moved upward, as shown in Figure 5. This end engages the speed cup and acting as a brake, it prevents oscillation of the latter at that particular time. At the end of the return stroke of the pawl, the spring 44 is returned to its former position and consequently the spring member 56 drops down out of engagement with the speed cup, thus permitting the latter to change its position if the speed of the vehicle has increased or decreased. It will be understood that the movements of the pawl 22 are quite rapid and consequently the spring 56 will only be held against the speed cup for a fraction of a second, and the speed cup is quite free to assume whatever position necessary to indicate the correct speed of the vehicle. All that spring 56 does is to tend to hold the speed cup intermittently at a point midway between the two extremes of its oscillating movement, caused by the rolling of the vehicle back and forth. Obviously, the spring 44 may be so shaped as to bear against the speed cup on its upward movement, thus performing the function of the spring member 56, which may then be omitted.

It will be apparent that I thus not only provide an improved ratchet drive in which noise and wear are eliminated, but have also provided a simple dampening means to prevent undesirable oscillation of the speed cup, this dampening means being driven by the movement of the ratchet drive mechanism.

It is thought from the foregoing taken in connection with the accompanying drawing that the construction and operation of the device will be apparent to those skilled in the art, and that various changes in size, shape and proportion and details of construction may be made without departing from the spirit and scope of the appended claims.

I claim:

1. In an indicating instrument, a driven shaft, a pawl eccentrically journalled on said shaft, a ratchet wheel adapted to be intermittently driven by said pawl, and means engaging the ratchet wheel operating end of said pawl on its driving stroke to hold the pawl against the ratchet wheel, said means engaging the opposite end of the pawl on its return stroke to hold the pawl away from the ratchet wheel.

2. In combination with a pawl and ratchet wheel driving mechanism, means adapted to hold the driving end of the pawl against the ratchet wheel on the driving stroke of the pawl, and means carried by said pawl adapted to cooperate with the first named means to lift the driving end of the pawl out of engagement with the ratchet wheel on the return stroke of the pawl.

3. In combination with a pawl and ratchet wheel driving mechanism, means adapted to engage the driving end of the pawl to hold it in engagement with the ratchet wheel on the driving stroke of the pawl, and means adapted to cooperate with the first named means to lift the latter out of engagement with the driving end of the pawl during the return stroke of the pawl, said second means also serving to lift the driving end of the pawl out of engagement with the ratchet wheel on the return stroke of the pawl.

4. In combination with a driving mechanism including a ratchet wheel and a pawl adapted to intermittently rotate said ratchet wheel, means adapted to engage the driving end of the pawl to hold it against the ratchet wheel on the driving stroke of said pawl, and means on the opposite end of the pawl adapted to lift the first named means out of engagement with the driving end of the pawl on its return stroke.

5. In combination with a driving mechanism including a ratchet wheel and a pawl adapted to intermittently rotate said ratchet wheel, means adapted to engage the driving end of the pawl to hold it against the ratchet wheel on the driving stroke of said pawl, and means on the opposite end of the pawl adapted to lift the first named means out of engagement with the driving end of the pawl on its return stroke, said means also serving to cause the driving end of the pawl to be lifted out of engagement with the ratchet wheel on the return stroke of the pawl.

6. In an indicating instrument, a driven shaft, a pawl eccentrically journalled on said shaft, a cam portion on said pawl, a ratchet wheel adapted to be intermittently driven by said pawl, and means adapted to engage the driving end of said pawl to hold the latter against said ratchet wheel when the pawl is being moved in driving direction, said cam portion being adapted to engage said means when the pawl is being moved in the opposite direction for the purpose of moving said means to such position that said pawl will be held out of engagement with said ratchet wheel.

7. In an indicating instrument, a driven shaft, a pawl eccentrically journalled on said shaft, a ratchet wheel adapted to be intermittently driven by said pawl, a spring member adapted to force said pawl against said ratchet wheel when the pawl is being moved in driving direction, and means associated with said pawl and adapted to engage said spring member when the pawl is being moved in the opposite direction for the purpose of moving said spring member to such position that said pawl will be held out of engagement with said ratchet wheel.

8. In combination with driving mechanism, including a ratchet wheel and a pawl adapted to intermittently rotate said ratchet wheel, means adapted to engage the driving end of said pawl to hold the latter against the ratchet wheel on the driving stroke of the pawl, and means adapted to move said first named means to a position wherein the latter will be held out of engagement with the driving end of the pawl during the return stroke of the pawl.

9. In combination with a driving mechanism, including a ratchet wheel and a pawl adapted to intermittently rotate said ratchet wheel, a spring member adapted to engage the driving end of the pawl to hold the latter against the ratchet wheel on the driving stroke of the pawl, and a cam portion on said pawl adapted to engage said spring member to hold the latter out of engagement with the driving end of the pawl during the return stroke of the pawl.

10. In combination with a driving mechanism including a ratchet wheel and a pawl adapted to intermittently rotate said ratchet wheel, means cooperating with one end of the pawl to hold the pawl against the ratchet wheel on the driving stroke of the pawl and cooperating with the opposite end of the pawl to hold the pawl out of contact with the ratchet wheel on the return stroke of the pawl.

In testimony whereof I affix my signature.

JOSEPH ZUBATY.